(12) United States Patent
Schmid et al.

(10) Patent No.: US 10,081,338 B2
(45) Date of Patent: Sep. 25, 2018

(54) CONNECTION ARRANGEMENT TO CONNECT A WIPER BLADE TO A WIPER ARM, WIPER BLADE AND WIPER ARM

(71) Applicant: Daimler AG, Stuttgart (DE)

(72) Inventors: Heiko Schmid, Oberriexingen (DE); Eric Schumacher, Bingen (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 15/039,831

(22) PCT Filed: Nov. 24, 2014

(86) PCT No.: PCT/EP2014/003123
§ 371 (c)(1),
(2) Date: May 26, 2016

(87) PCT Pub. No.: WO2015/078569
PCT Pub. Date: Jun. 4, 2015

(65) Prior Publication Data
US 2016/0375875 A1    Dec. 29, 2016

(30) Foreign Application Priority Data
Nov. 27, 2013    (DE) .................. 10 2013 019 805

(51) Int. Cl.
*B60S 1/40* (2006.01)
*B60S 1/42* (2006.01)
*B60S 1/38* (2006.01)

(52) U.S. Cl.
CPC ............. *B60S 1/42* (2013.01); *B60S 1/381* (2013.01); *B60S 1/3849* (2013.01);
(Continued)

(58) Field of Classification Search
CPC .... B60S 1/4045; B60S 1/4048; B60S 1/4016; B60S 1/4083; B60S 2001/4051; B60S 2001/4054; B60S 2001/4058
See application file for complete search history.

(56) References Cited

U.S. PATENT DOCUMENTS 6,481,044 B1    11/2002  Journee
6,599,051 B1 *  7/2003  Jarasson ............... B60S 1/4038
                                                    15/250.32
(Continued)

FOREIGN PATENT DOCUMENTS

DE    699 04 591 T2    9/2003
DE    102009059119   *  6/2011
(Continued)

OTHER PUBLICATIONS

PCT/EP2014/003123, International Search Report dated Apr. 7, 2015 (Two (2) pages).

*Primary Examiner* — Gary Graham
(74) *Attorney, Agent, or Firm* — Crowell & Moring LLP

(57) ABSTRACT

A connection arrangement to connect a wiper blade to a wiper arm is disclosed. A connection element includes an upper part formed to fasten the connection element to the wiper arm, on which upper part a lower part formed to hold a basic body of the wiper blade is mounted to be pivotable around a rotational axis. A slider encloses the wiper arm in an end region, where the slider is able to move along the wiper arm from an assembly position into a functional position securing the connection element. A securing element prevents a movement of the slider into the assembly position during a pivot movement of the lower part around the rotational axis by a first value and allows the movement of the slider into the assembly position if the lower part is pivoted by a second value which is greater than the first value.

13 Claims, 6 Drawing Sheets

(52) U.S. Cl.
CPC ........... *B60S 1/3856* (2013.01); *B60S 1/4038* (2013.01); *B60S 1/4045* (2013.01); *B60S 1/4048* (2013.01); *B60S 2001/4051* (2013.01); *B60S 2001/4058* (2013.01)

(56) References Cited

U.S. PATENT DOCUMENTS

| | | |
|---|---|---|
| 2006/0059647 A1 | 3/2006 | Ostrowski |
| 2010/0306949 A1 | 12/2010 | Op't Roodt et al. |
| 2015/0166018 A1 | 6/2015 | Egner-Walter et al. |
| 2015/0353054 A1 | 12/2015 | Tolentino et al. |

FOREIGN PATENT DOCUMENTS

| | | | |
|---|---|---|---|
| DE | 10 2010 052 315 A1 | | 5/2012 |
| DE | 10 2011 118 220 A1 | | 5/2012 |
| DE | 202010017467 | * | 6/2012 |
| DE | 10 2012 021 472 A1 | | 5/2013 |
| DE | 10 2011 057 118 A1 | | 7/2013 |
| EP | 2 803 542 A1 | | 11/2014 |
| FR | 2886253 | * | 12/2006 |

\* cited by examiner

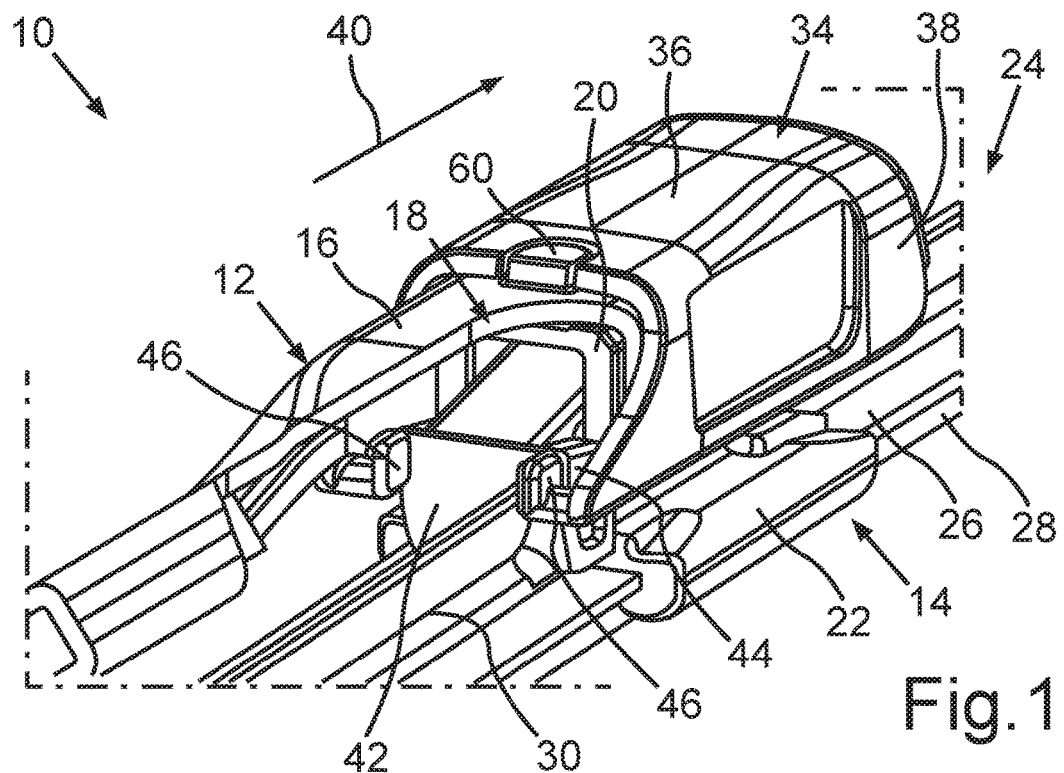
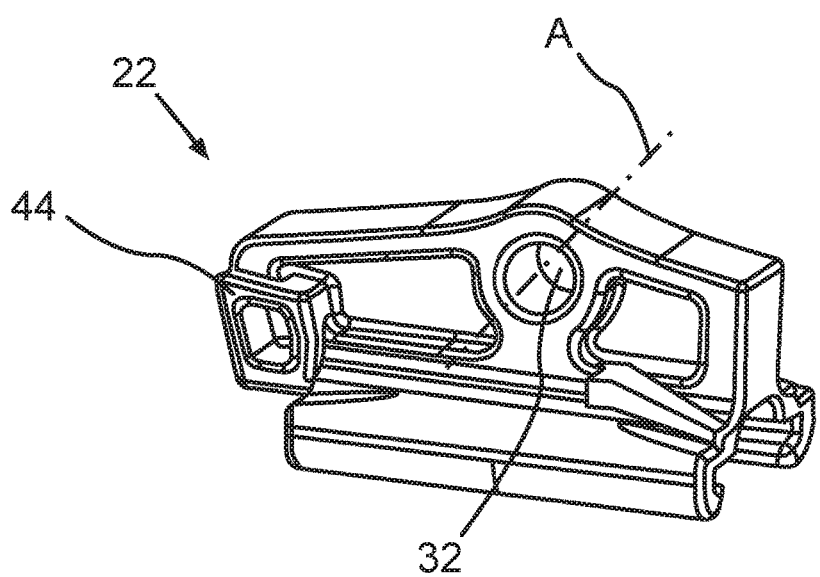

US 10,081,338 B2

CONNECTION ARRANGEMENT TO CONNECT A WIPER BLADE TO A WIPER ARM, WIPER BLADE AND WIPER ARM

BACKGROUND AND SUMMARY OF THE INVENTION

The invention relates to a connection arrangement to connect a wiper blade to a wiper arm for a windscreen wiper system of a vehicle. A connection element comprises an upper part formed to fasten the connection element to the wiper arm. A lower part of the connection element is mounted on the upper part to be pivotable around a rotational axis. The lower part is formed to hold a basic body of the wiper blade. A slider encompassing the wiper arm in an end region is able to be moved along the wiper arm from an assembly position into a functional position securing the connection element. Furthermore, the invention relates to a wiper blade and a wiper arm for such a connection arrangement.

A connection arrangement of the type referred to at the beginning is described in DE 10 2010 052 315 A1. Here, in the case of a slider which has been moved into the assembly position, the connection element can be removed from the end region of the wiper arm formed as a receiver in a direction which runs perpendicularly to a longitudinal extension direction of the wiper blade or of the wiper arm. During exchange of the wiper blade, the connection element is correspondingly introduced into the receiver from below after the moving of the slider into the assembly position. Subsequently, the slider is moved towards an end of the wiper arm, at which the wiper arm is connected to a drive shaft of a wiper motor.

It can, however, occur that the slider moves in an undesired manner into the assembly position, for example due to an external, unintentional application of force on the slider.

The object of the present invention is therefore to create a connection arrangement, a wiper blade and a wiper arm of the type referred to at the beginning in which an improved fixing of the wiper blade to the wiper arm can be ensured.

The connection arrangement according to the invention comprises at least one securing element which prevents a movement of the slider into the assembly position during a pivot movement of the lower part around the rotational axis by a first value. However, the securing element allows the movement of the slider into the assembly position during a pivot movement of the lower part around the rotational axis by a second value which is greater than the first value. Such a securing element prevents an unintentional self-release of the slider, so the movement of the same into the assembly position, as long as the lower part is not pivoted around the rotational axis by more than the first value. If, however, the wiper blade is changed, then only the lower part needs to be pivoted around the rotational axis by the second value, and the slider can easily be moved from the functional position into the assembly position which is the same as a disassembly position.

This enables the forces to be applied to move the slider into the assembly position and back into the functional position to be designed such that an operator can easily apply them without an aid such as, for example, tools. Therefore, the wiper blade is held securely on the wiper arm via the slider. Therefore, an improved fixing of the wiper blade to the wiper arm is ensured.

Additionally, pivot movements of the lower part relative to the upper part by the first value are possible, such that a good wiping performance is always achieved during the wiping operation. The securing element additionally allows it to be ensured that the connection element is not incorrectly introduced into the end region of the wiper arm. It therefore serves as a rotation lock. Furthermore, it is sufficient to design the actuation forces to be applied to move the slider to be very low and therefore comfortable, since only a holding of the wiper itself in the assembly position needs to be ensured.

Preferably, the at least one securing element is formed in such a way that the pivot movement of the lower part around the rotational axis by the first value occurs during the wiping operation. Then it is ensured that the securing element securely prevents an undesired opening of the slider, so the movement thereof into the assembly position, during the wiping operation. In the case of a pivoting of the lower part around the rotational axis beyond the values occurring during the wiping operation, however, it can be very easily provided that the wiper can be moved into the assembly position in which the connection element is able to be removed from the end region of the wiper arm. Such large pivot movements, however, do not occur regularly during the wiping operation. Rather, a further rotation of the lower part around the rotational axis is necessary in order to move the wiper into its disassembly position or assembly position.

In a further advantageous embodiment, the connection element is held in the functional position in a longitudinal direction of the wiper blade to be fixed in terms of position between the at least one securing element and a front-side end of the slider. It is therefore ensured that the wiper blade is guided securely on the windscreen during the wiping operation. At the same time, a movement of the connection element in the longitudinal direction of the wiper blade is particularly securely prevented, and therefore a particularly good fixing of the wiper blade to the wiper arm is ensured.

The at least one securing element can be formed as a projection arranged on the slider, the projection being in contact with a stop provided on sides of the lower part during the pivot movement of the lower part around the rotational axis by the first value. Then, the connection element does not need to be modified in order to prevent an undesired self-release of the slider.

Additionally or alternatively, the at least one securing element can comprise a projection provided on sides of the lower part, the projection being in contact with a stop provided on sides of the slider during the pivot movement of the lower part around the rotational axis by the first value. It is thereby ensured that the securing element is also exchanged during an exchange of the wiper blade. In the case of wear and a loss in function of the securing element accompanying this, a remedy can easily be ensured.

The securing element can here in particular be formed as an additional part arranged on the wiper blade which is in contact with the lower part. Then, an existing wiper blade can also be retrofitted particularly simply, since additionally the securing element needs to be attached only to the wiper blade.

Alternatively, the projection can be formed in one piece with a basic body of the lower part. Therefore, a particularly compact and functionally secure connection element can be provided.

In the case of the wiper blade according to the invention, the at least one securing element is arranged on the lower part of the connection element. However, also in the case of the wiper arm according to the invention, the at least one securing element can be arranged on the slider.

The advantages described for the connection arrangement according to the invention and preferred embodiments also apply to the wiper blade according to the invention and the wiper arm according to the invention.

The features and feature combinations referred to in the description as well as the features and feature combinations referred to below in the description of the figures and/or shown solely in the figures are not only applicable in the respectively specified combination, but also in other combinations or alone, without leaving the scope of the invention. Therefore, embodiments must be considered as comprised and disclosed by the invention which are not explicitly shown or explained in the figures, yet emerge from or are able to be generated by separate feature combinations of the explained embodiments.

Further advantages, features and details of the invention result from the claims, the below description of preferred embodiments and by means of the drawings.

BRIEF DESCRIPTION OF THE DRAWINGS

FIG. 1 illustrates a connection arrangement, wherein a wiper blade is held on a wiper arm, which is depicted in sections and partially cut, for a windscreen wiper system of a vehicle, and wherein a slide lock is moved into a functional position in which it secures an adapter of the wiper blade from self-release of the wiper arm;

FIG. 2 shows perspectively, a lower part of the adapter according to FIG. 1, formed as a tab;

DETAILED DESCRIPTION OF THE DRAWINGS

Figure 3:
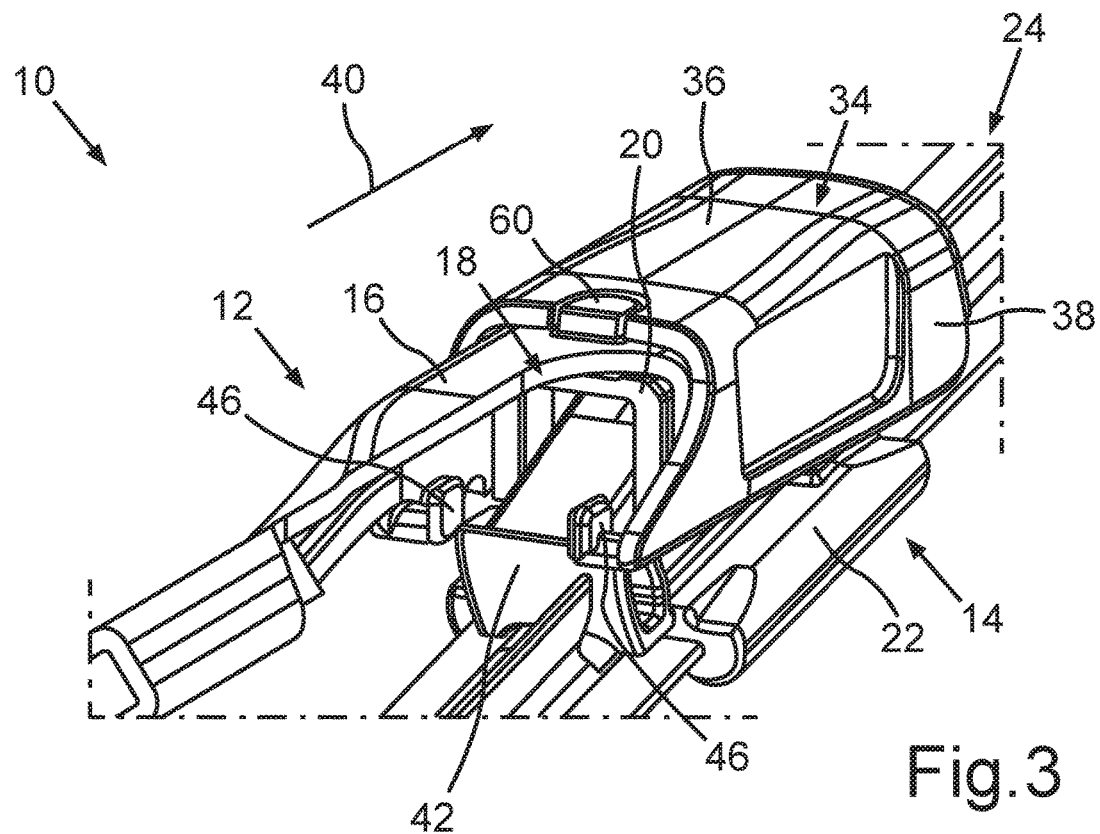
FIG. 3 illustrates a pivoting of the lower part relative to the upper part of the adapter into a position in which the slide lock is able to move into its disassembly position in which the wiper blade can be disassembled from the wiper arm.

A wiper arm 12 and a wiper blade 14 of a windscreen wiper system of a vehicle are shown in sections in FIG. 1 from a connection arrangement 10. An adapter 18 serving as a connection element is held in an end region 16 of the wiper arm 12 depicted in a partially cut manner. The adapter 18 comprises an upper part formed as a rocker 20 and a lower part formed as a tab 22. Here, the tab 22 serves to hold a basic body 24 of the wiper blade 14. The basic body 24 presently comprises two spring rails 26 which are enclosed by grip elements of the tab 22, and a wiper lip 28 of the wiper blade 14. Additionally, the wiper blade 14 can have a spoiler 30.

The tab 22 is able to pivot relative to the rocker 20 around a rotational axis A, which is depicted in FIG. 2. This rotational axis A is provided by a pin which is guided through a through-opening 32 provided in the tab 22. The ends of this pin are received in openings which are arranged in limbs of the rocker 20 which has a U-profile in cross-section. These limbs and a back of the rocker 20 lie on limbs and a back of the end region 16 of the wiper arm 12 which likewise has a U-profile in cross-section.

The adapter 18 is presently secured against a self-release of the adapter 18 from the wiper arm 12 by means of a slider in the form of a slide lock 34, which likewise has a U-profile in cross-section with a back 36 and lateral limbs 38. Bars or strips project inwards from the limbs 38 of the slide lock 34, the bars or strips enclosing the limbs of the wiper arm 12 on the lower side in the end region 16 thereof.

In order to release the adapter 18 and with this the wiper blade 14 from the wiper arm 12, the slide lock 34 is moved in a direction which is illustrated by an arrow 40 in FIG. 1. The slide lock 34 is therefore moved into an assembly position or disassembly position in which it extends over a free end of the wiper arm 12.

Presently it is prevented that the slide lock 34 is moved undesirably in the direction specified by the arrow 40. For this purpose, in the case of the connection arrangement 10 shown in FIG. 1, a projection is provided as a securing element 42, which is formed in one piece with the tab 22. Lateral end regions 44 of this securing element 42 are in contact with stops 46 provided on the limbs 38 of the slide lock 34. This is the case provided that the tab 22 and therefore the basic body 24 of the wiper blade 14 is pivoted around the rotational axis A relative to the upper part formed as the rocker 20 only as far as this occurs during the wiping operation.

Figure 13:
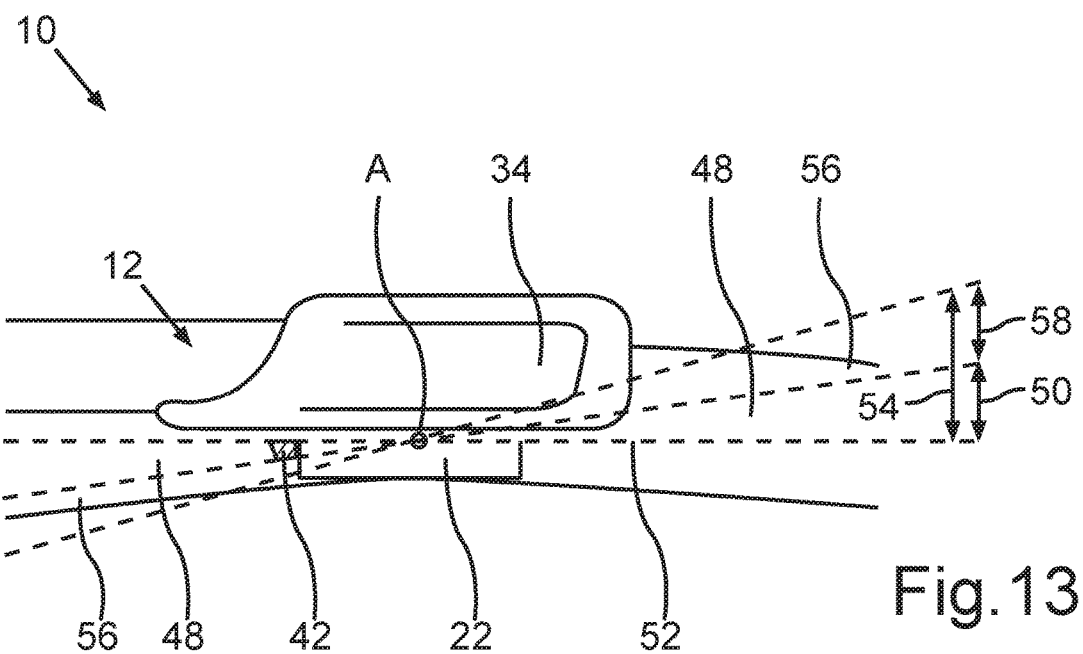
FIG. 13 illustrates a variant of the connection arrangement in which a projection serving as a securing element is arranged on the slid lock.

A corresponding work region 48 in which pivot movements of the tab 22 around the pivot axis A occur during the wiping operation is shown in FIG. 13. It is ensured by pivoting the tab 22—and, together with this, the basic body 24 of the wiper blade 14—in the work region 48 that the wiper lip 28 is always supported on the windscreen of the vehicle during the wiping operation. A first value 50 by which the tab 22 is pivoted with regard to the horizontal 52 during the wiping operation, so a value corresponding to the work region 48, is likewise illustrated in FIG. 13. The value 50 can be specified as an angle with regard to the horizontal 52.

If, however, the wiper blade 14 is to be released from the wiper arm 12, then the tab 22, and with this the basic body 24 of the wiper blade 14, can be pivoted further around the rotational axis A than is the case for movements occurring during the wiping operation, so in the work region 48. The tab 22 therefore moves in the work region 48 as long as the wiper lip 28 is supported on the windscreen of the vehicle. During movements of the tab 22 in this work region 48, the securing element 42 ensures that the slide lock 34 cannot be moved into its disassembly position. Then, in particular, the stops 46 are in contact with the securing element 42. In this way, a positive securing of the slide lock 34 is ensured.

On the other hand, in the case of the wiper arm 12 folded away from the windscreen, the basic body 24 of the wiper blade 14 and therefore of the tab 22 can be pivoted by a second value 54 which is greater than the first value 50 (FIG. 13 for comparison). The second value 54 can also be specified as an angle with regard to the horizontal 52. A total pivot region 56 of the tab 22 around the rotational axis A, corresponding to the second value 54, is larger than the work region 48. A difference 58 between the second value 54 and the first value 50 is likewise specified in FIG. 13 for illustration. This difference 58 corresponds to a disassembly region of the maximum possible pivot movement which is specified by the pivot region 56.

If the basic body 24 of the wiper blade 14 is pivoted beyond the work region 48 into the disassembly region, then the slide lock 34 can be moved in the direction specified by the arrow 40, so beyond the free end of the wiper arm 12. This is possible, because then the stops 46 are no longer in contact with the end regions 44 of the securing element 42.

Figure 4:
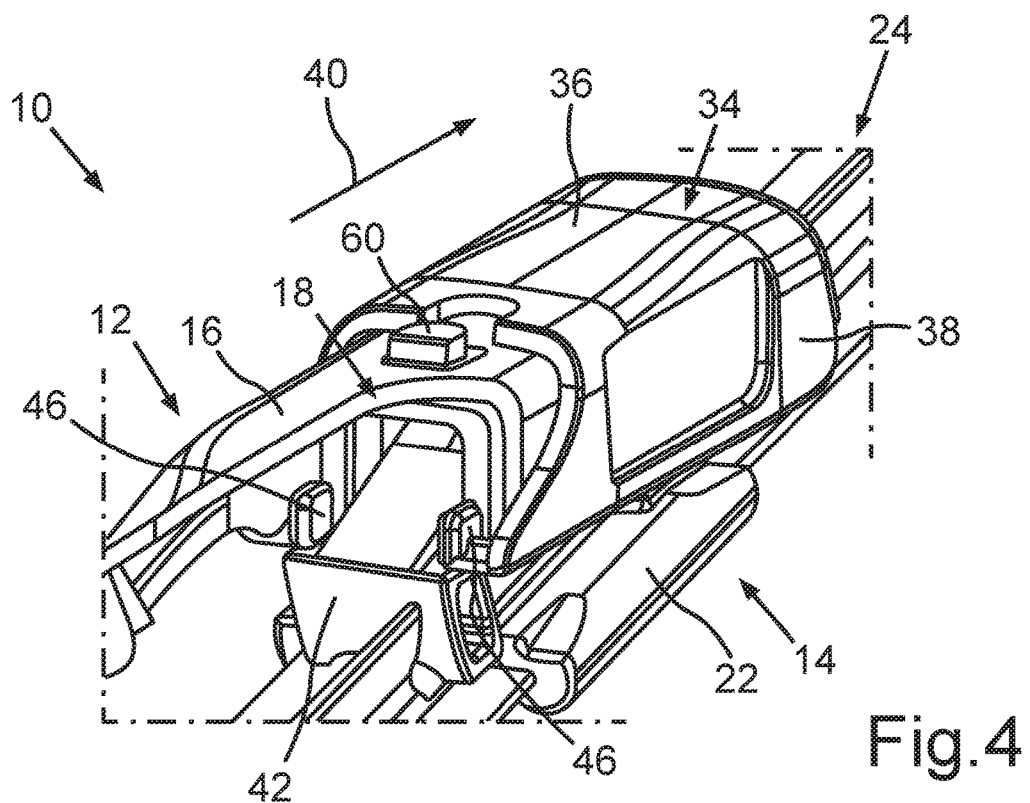
FIG. 4 illustrates the movement of the slide lock into the disassembly position in the connection arrangement according to FIG. 1.

The basic body 24 of the wiper blade 14 pivoted beyond the work region 48 is shown in FIG. 3 in this pivot position in which the securing element 42 releases the stops 46. As is shown in FIG. 4, the slide lock 34 can then be moved in the direction specified by the arrow 40. Correspondingly, the slide lock 34 is then at a distance from a pin 60 which belongs to the rocker 20 and enters through an opening provided in the back of the wiper arm 12.

Therefore, as soon as the tab 22 is pivoted beyond the work region 48, the securing element 42 releases the stops 46, and the slide lock 34 can be moved into the disassembly or assembly position shown in FIG. 4 in which the adapter 18 can be removed downwards from the end region 16 of the wiper arm 12 or can be introduced from below into the end region 16.

Figure 5:
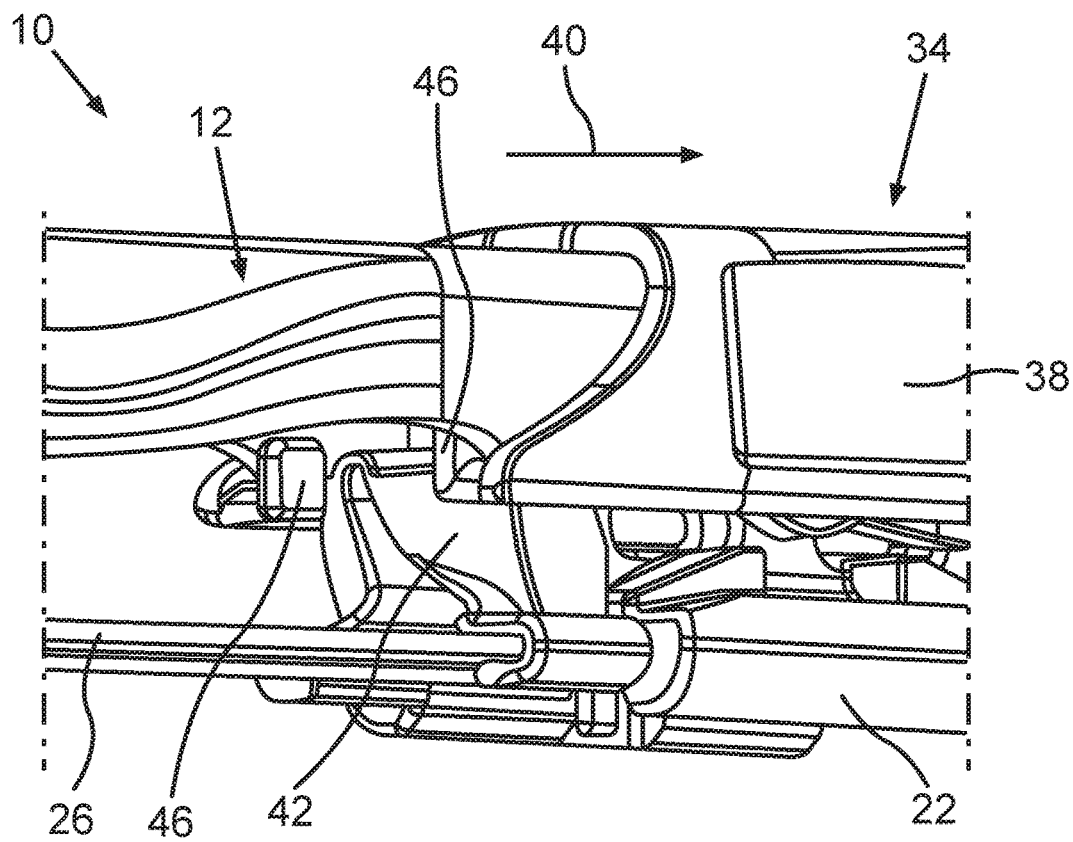
FIG. 5 shows perspectively, a wiper arm arrangement in which a securing element preventing the movement of the slide lock into the disassembly position is formed as a separate component to the lower part of the adapter.

The securing element 42 is formed as a separate component to the tab 22 in the case of the connection arrangement 10 shown in FIG. 5. However, here the stops 46 of the slide lock 34 are also in contact with the securing element 42 as long as the tab 22 is pivoted around the rotational axis A only in the work region 48 during the wiping operation.

Figure 6:
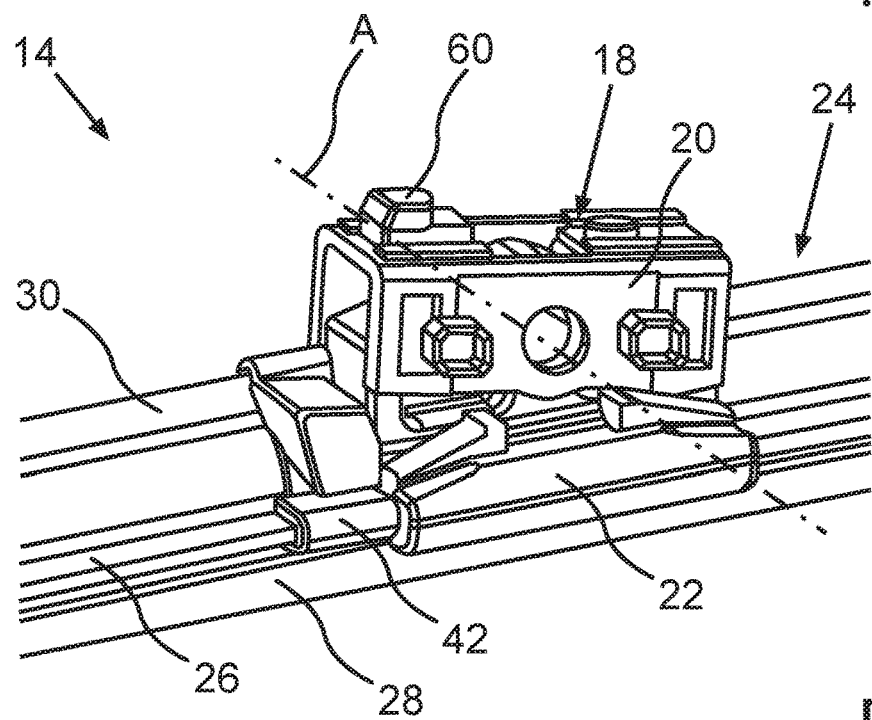
FIG. 6 illustrates the wiper blade according to FIG. 5, disassembled from the wiper arm, in a perspective view.

The ability to pivot of the basic body 24 and, with this, the tab 22 around the pivot axis or rotational axis A relative to the rocker 20 of the adapter 18 can be seen particularly well from the perspective view of the wiper blade 14 in FIG. 6.

Figure 7:
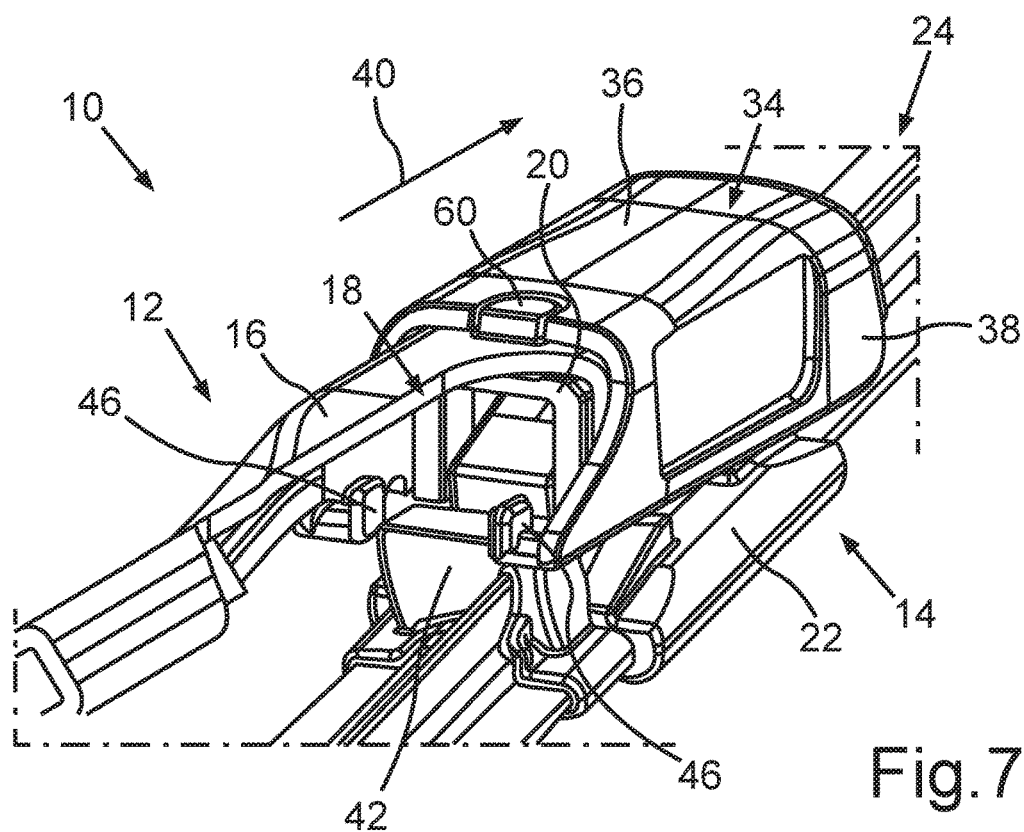
FIG. 7 illustrates the pivoting of the lower part of the adapter according to FIG. 5 into a position in which the slide lock is able to be moved into its disassembly position.

FIG. 7 shows the tab 22 pivoted beyond the work region 48 in the pivot region 56. Correspondingly, in this position of the basic body 24 of the wiper blade 14, the stops 46 are no longer in contact with the securing element 42.

Figure 8:
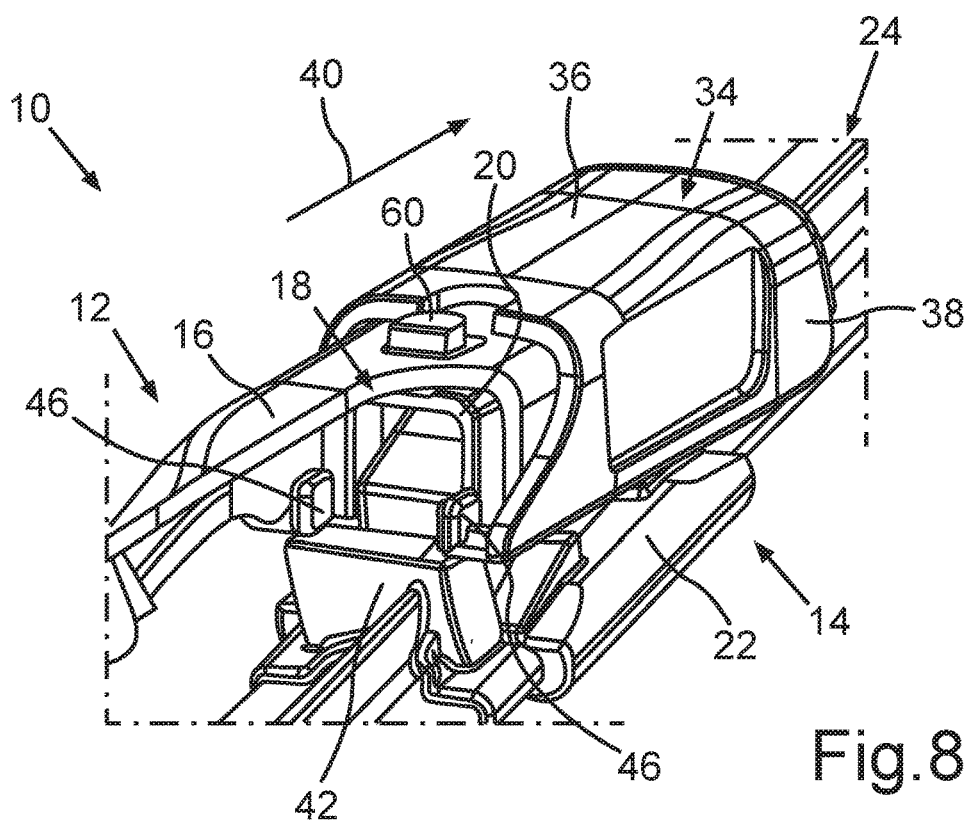
FIG. 8 illustrates the movement of the slide lock into the disassembly position in the connection arrangement according to FIG. 5.

The slide lock 34 can, as a consequence, as shown in FIG. 8, be moved beyond the free end of the wiper arm 12 in the direction specified by the arrow 40. Also, here, the slide lock 34 moved into the disassembly position is then at a distance from the pin 60. During assembly and corresponding moving of the slide lock 34 into its functional position shown in FIG. 1, the pin 60 serves, among other things, as a stop to limit the movement of the slide lock 34 in a direction opposed to the arrow 40.

Figure 9:
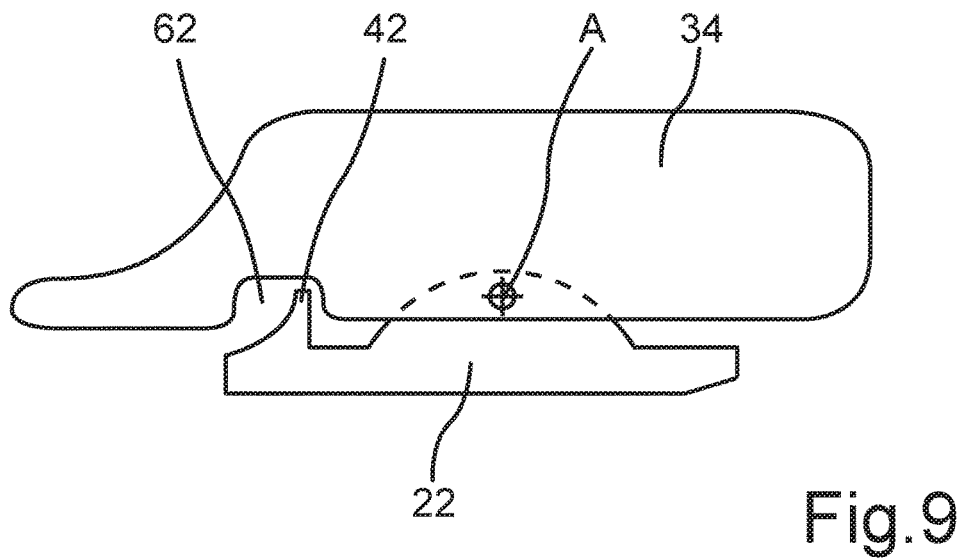
FIG. 9 illustrates in a schematic side view, a securing element formed in one piece with the lower part which secures the slide lock.

FIG. 9 shows, schematically, a securing element 42 formed in one piece with the tab 22, the securing element being formed as a nib, wherein this nib engages with a notch or recess 62 which is provided in the slide lock 34. The nib, however, here also only then reaches into the recess 62 if the tab 22 is pivoted around the rotational axis A in the work region 48.

Figure 10:
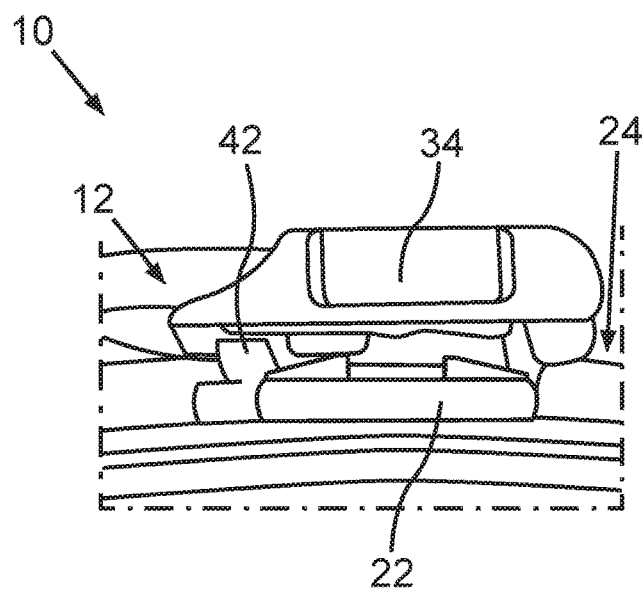
FIG. 10 illustrates in a perspective view and in sections, a connection arrangement in which a projection provided on the lower part fixes the slide lock.

FIG. 10 shows the securing element 42 formed as a nib, which secures the slide lock 34 against a movement into its disassembly position, so fixes it.

Figure 11:
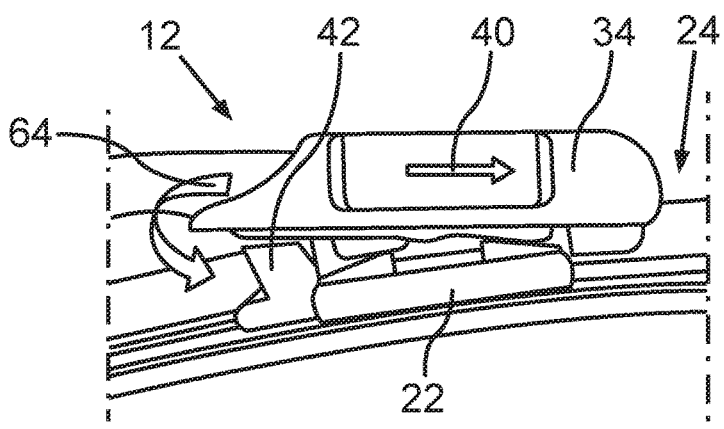
FIG. 11 illustrates in the connection arrangement according to FIG. 10, the pivoting of the lower part relative to the upper part into a pivot position in which the slide lock is no longer secured.

In FIG. 11, however, the tab 22 is depicted to have further pivoted around the rotational axis A, in particular beyond the work region 48. The wiper blade 14 is therefore located in a disassembly position, and the securing element 42 formed as a nib releases the slide lock 34. This can, as a consequence, be moved in the direction illustrated by the arrow 40, so forwards. The pivot movement of the tab 22 around the rotational axis A is illustrated in FIG. 11 by a further arrow 64.

Figure 12:
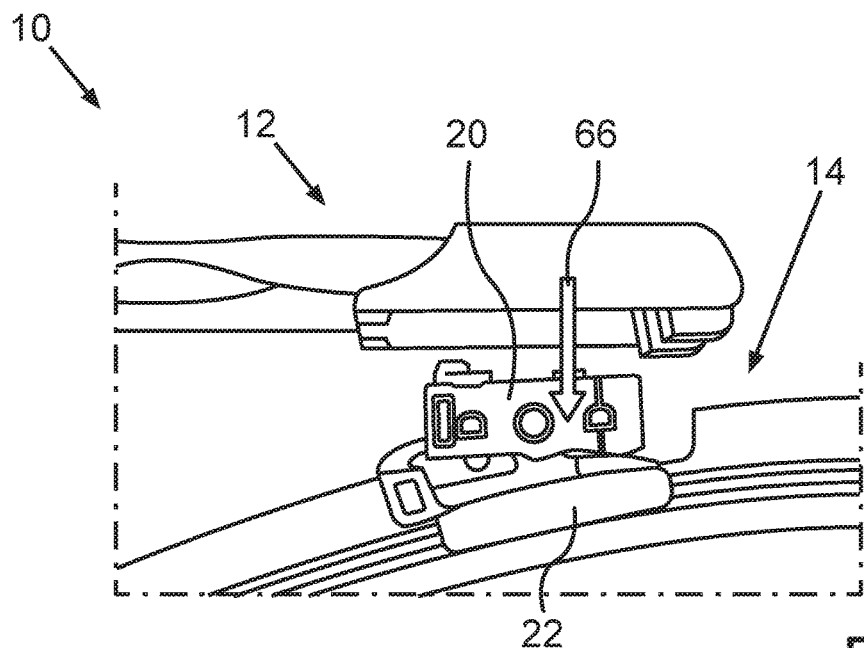
FIG. 12 illustrates in the connection arrangement according to FIG. 10, the disassembly of the wiper blade from the wiper arm.

FIG. 12 shows the wiper blade 14 in its disassembly position with an opened slide lock 34. Correspondingly, the adapter 18 and, with this, the entire wiper blade 14 can be removed downwards from the end region 16 of the wiper arm 12 formed as a receiver. A corresponding removal direction is illustrated in FIG. 12 by a further arrow 66.

FIG. 13 shows a variant of the connection arrangement 10 in which the securing element 42 is formed as a projection arranged on the slide lock 34, the projection being in contact with a stop provided on the tab 22, as long as the tab 22 pivots around the rotational axis A by a maximum of a first value 50, so in the work region 48.

The securing element 42 serving as a positively bonded additional element is arranged such that it is not influenced by external applications of force which could cause a movement of the slide lock 34 in the direction specified by the arrow 40 without the provision of the securing element 42. This positively bonded additional element can, as shown in FIG. 1, be formed in one piece with the tab 22 or, as shown in FIG. 5, be formed as a separate component.

The invention claimed is:

1. A connection arrangement to connect a wiper blade to a wiper arm for a windscreen wiper system of a vehicle, comprising:
   a connection element which includes an upper part for fastening the connection element to the wiper arm and a lower part for holding a basic body of the wiper blade, wherein the lower part is pivotably mounted on the upper part;
   a slider, wherein the wiper arm is enclosable in an end region by the slider, wherein the slider is movable along the wiper arm from an assembly position into a functional position securing the connection element; and
   a securing element, wherein the securing element prevents a movement of the slider into the assembly position during a pivot movement of the lower part around a rotational axis by a first value and allows a movement of the slider during a pivot movement of the lower part around the rotational axis by a second value which is greater than the first value.

2. The connection arrangement according to claim 1, wherein the pivot movement of the lower part around the rotational axis by the first value is occurable during a wiping operation.

3. The connection arrangement according to claim 1, wherein in the functional position, the connection element is held securely in terms of position in a longitudinal direction of the wiper blade between the securing element and a front-side end of the slider.

4. The connection arrangement according to claim 1, wherein the securing element is a projection disposed on the slider which is in contact with a stop provided on sides of the lower part during the pivot movement of the lower part around the rotational axis by the first value.

5. The connection arrangement according to claim 1, wherein the securing element is a projection disposed on sides of the lower part, wherein the projection is in contact with a stop disposed on sides of the slider during the pivot movement of the lower part around the rotational axis by the first value.

6. The connection arrangement according to claim 5, wherein the projection is formed in one piece with a basic body of the lower part.

7. The connection arrangement according to claim 1, wherein the slider has a U-profile in cross-section having a back and two limbs, wherein a bar that is able to encompass the wiper arm on a lower side in the end region is disposed on at least one of the two limbs.

8. A wiper blade with a connection arrangement according to claim 1, wherein the securing element is disposed on the lower part of the connection element.

9. A wiper arm with a connection arrangement according to claim 1, wherein the securing element is disposed on the slider.

10. A wiper blade, comprising:
 a connection element of a connection arrangement according to claim 1.

11. The wiper blade according to claim 10, wherein the securing element of the connection arrangement is a projection disposed on sides of the lower part of the connection element.

12. The wiper blade according to claim 11, wherein the projection is formed in one piece with a basic body of the lower part.

13. The wiper blade according to claim 10, wherein the securing element of the connection arrangement is formed as a part that is disposed on the wiper blade.

* * * * *